United States Patent
Horiguchi et al.

(10) Patent No.: US 11,352,019 B2
(45) Date of Patent: Jun. 7, 2022

(54) ELECTRONIC CONTROL DEVICE FOR VEHICLE

(71) Applicant: Hitachi Automotive Systems, Ltd., Hitachinaka (JP)

(72) Inventors: Tatsuya Horiguchi, Tokyo (JP); Hideyuki Sakamoto, Ibaraki (JP); Teppei Hirotsu, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 357 days.

(21) Appl. No.: 16/607,631

(22) PCT Filed: Mar. 8, 2018

(86) PCT No.: PCT/JP2018/008904
§ 371 (c)(1),
(2) Date: Oct. 23, 2019

(87) PCT Pub. No.: WO2018/198547
PCT Pub. Date: Nov. 1, 2018

(65) Prior Publication Data
US 2020/0070847 A1    Mar. 5, 2020

(30) Foreign Application Priority Data

Apr. 24, 2017 (JP) .............................. JP2017-085139

(51) Int. Cl.
*G01M 17/00* (2006.01)
*B60W 50/04* (2006.01)
(Continued)

(52) U.S. Cl.
CPC ............ *B60W 50/04* (2013.01); *B60W 50/14* (2013.01); *G06N 5/04* (2013.01); *G07C 5/08* (2013.01); *B60W 2050/146* (2013.01)

(58) Field of Classification Search
CPC ..... B60K 26/021; B60Q 9/008; B60W 10/04; B60W 10/10; B60W 10/18; B60W 30/09; F16H 59/20; G05G 1/38; G05G 1/44
See application file for complete search history.

(56) References Cited

U.S. PATENT DOCUMENTS 9,805,601 B1 *  10/2017  Fields ..................... B60T 17/22
2015/0336578 A1 *  11/2015  Lord ......................... B60T 7/22
                                                                      701/2
(Continued)

FOREIGN PATENT DOCUMENTS

EP    3138706 A1 *  3/2017  ............ B60W 10/22
JP    2009-61942 A    3/2009
(Continued)

OTHER PUBLICATIONS

International Search Report (PCT/ISA/210) issued in PCT Application No. PCT/JP2018/008904 dated Jul. 3, 2018 with English translation (three (3) pages).

(Continued)

*Primary Examiner* — Adam M Alharbi
(74) *Attorney, Agent, or Firm* — Crowell & Moring LLP (57) ABSTRACT

An electronic control device for a vehicle according to the present invention includes an action prediction unit that predicts the action of an object around the vehicle on the basis of external information acquired from external information detection units that detect external information of the vehicle, and a determination unit for a detection unit that determines whether an abnormality has occurred in the external information detection unit by comparing external information acquired from the external information detection unit at the time corresponding to a prediction result of the action prediction unit to the prediction result of the action prediction unit.

7 Claims, 7 Drawing Sheets

(51) Int. Cl.
_B60W 50/14_ (2020.01)
_G06N 5/04_ (2006.01)
_G07C 5/08_ (2006.01)

(56) References Cited

U.S. PATENT DOCUMENTS

| | | |
|---|---|---|
| 2018/0170374 A1 | 6/2018 | Otsuka et al. |
| 2018/0194364 A1 | 7/2018 | Asakura et al. |
| 2018/0251124 A1* | 9/2018 | Westover ........ B60W 30/18163 |

FOREIGN PATENT DOCUMENTS

| | | |
|---|---|---|
| JP | 2017-47694 A | 3/2009 |
| JP | 2010-126130 A | 6/2010 |
| WO | WO 2017/010264 A1 | 1/2017 |

OTHER PUBLICATIONS

Japanese-language Written Opinion (PCT/ISA/237) issued in PCT Application No. PCT/JP2018/008904 dated Jul. 3, 2018 (four (4) pages).

* cited by examiner

ELECTRONIC CONTROL DEVICE FOR VEHICLE

TECHNICAL FIELD

The present invention relates to an electronic control device of a vehicle.

BACKGROUND ART

In a case of system failure of the automatic driving system, an automatic driving system electronic control unit (ECU), which is a higher-level control device for controlling the automatic driving, is required to continue automatic driving operation for a certain period of time until the driver takes over the operation. Such failure includes, for example, an abnormality that occurs during calculation on an arithmetic processing unit that performs calculations for automatic driving control, and an abnormality that occurs in a sensor.

To continue operation for a fixed period of time even when a failure occurs, it is necessary to detect the abnormality and switch control to the control corresponding to the abnormality. Methods used to detect such a failure or abnormality typically include a method of comparing the output by multiplexing arithmetic processing or sensors, and a method of verifying the validity of the calculation result or the sensor output value using another sensor value or calculation result. However, in the case of multiplexing sensors and arithmetic devices, there is a problem such as complication of the system configuration due to an increase of the number of sensors and an increase in arithmetic processing load, so a method for verifying the validity is required.

PTL 1 discloses a device that detects or corrects a value deviation of a sensor that detects a state quantity of a host vehicle using a type of sensor different from the sensor. In PTL 1, abnormality is detected by evaluating the validity of a sensor output value.

CITATION LIST

Patent Literature

PTL 1: JP 2009-061942 A

SUMMARY OF INVENTION

Technical Problem

By the verification method described in PTL 1, it is possible to detect a failure or abnormality that has occurred in a determination target sensor using a verification sensor that is different from the determination target sensor, but no means is disclosed for detecting the abnormality that occurs in the verification sensor.

In the automatic driving ECU, the position and the speed of a surrounding object are recognized using a plurality of sensors simultaneously and complementing the characteristics of the respective sensors. Therefore, complementary verification processing and abnormality detection processing using various sensors are necessary.

The present invention has been made in view of the above problems, and it is an object to provide an electronic control device of a vehicle that can determine whether an abnormal state has occurred with a relatively simple configuration.

Solution to Problem

To solve the above problems, an electronic control device of a vehicle according to the present invention, includes an action prediction unit that predicts an action of an object around the vehicle in accordance with external information acquired from an external information detection unit that detects external information of the vehicle, and a determination unit for a detection unit that determines whether an abnormality has occurred in the external information detection unit by comparing the external information acquired from the external information detection unit at the time corresponding to a prediction result of the action prediction unit to the prediction result of the action prediction unit.

Advantageous Effects of Invention

According to the present invention, the occurrence of abnormality in the external information detection unit can be determined by comparing the result of the action of the object around the vehicle predicted on the basis of the external information from the external information detection unit to the external information from the external information detection unit at the time corresponding to the prediction result.

DESCRIPTION OF EMBODIMENTS

Embodiments of the present invention will be described below by referring to the accompanying drawings. In the present embodiment, a predetermined calculation is performed on the basis of first information detected by an information detection unit (external information detection unit 20), and a first calculation result is compared to second information (the second information is detected after the first information) detected by the information detection unit, or a second calculation result obtained by performing a predetermined calculation on the basis of the second information. Thus, the present embodiment can perform self-diagnose as to whether an abnormality has occurred in the information detection unit or the arithmetic processing unit that executes a predetermined operation.

One example of the present embodiment, as described in detail below, includes the external information detection unit that detects external information of a vehicle 1 and an action prediction unit (S2) that predicts a behavior (action) of an object located around the vehicle 1. Information M2(T1) obtained by predicting the action of the surrounding object by the action prediction unit is compared to external information obtained from the external information detection unit 20 to determine the occurrence of abnormality in the external information detection unit 20.

According to the present embodiment, it is possible to detect the abnormality occurring in the external information detection unit 20 by comparing information predicted from past external information (prediction result of the action prediction unit) to the current external information. Further, according to the present embodiment, it is also possible to detect the abnormality occurring in the comprehensive calculation unit by comparing the calculation result of an integrated calculation unit (S1), which performs integrated calculation on the basis of the external information from the external information detection unit 20, to the prediction result of the action prediction unit, the integrated calculation unit.

Therefore, according to the present embodiment, it is possible to diagnose the occurrence of abnormality in the external information detection unit 20 or the integrated calculation unit (S1) with a relatively simple configuration without multiplexing the detection circuit, the arithmetic processing circuit, and the computer program.

First Embodiment

Figure 1:
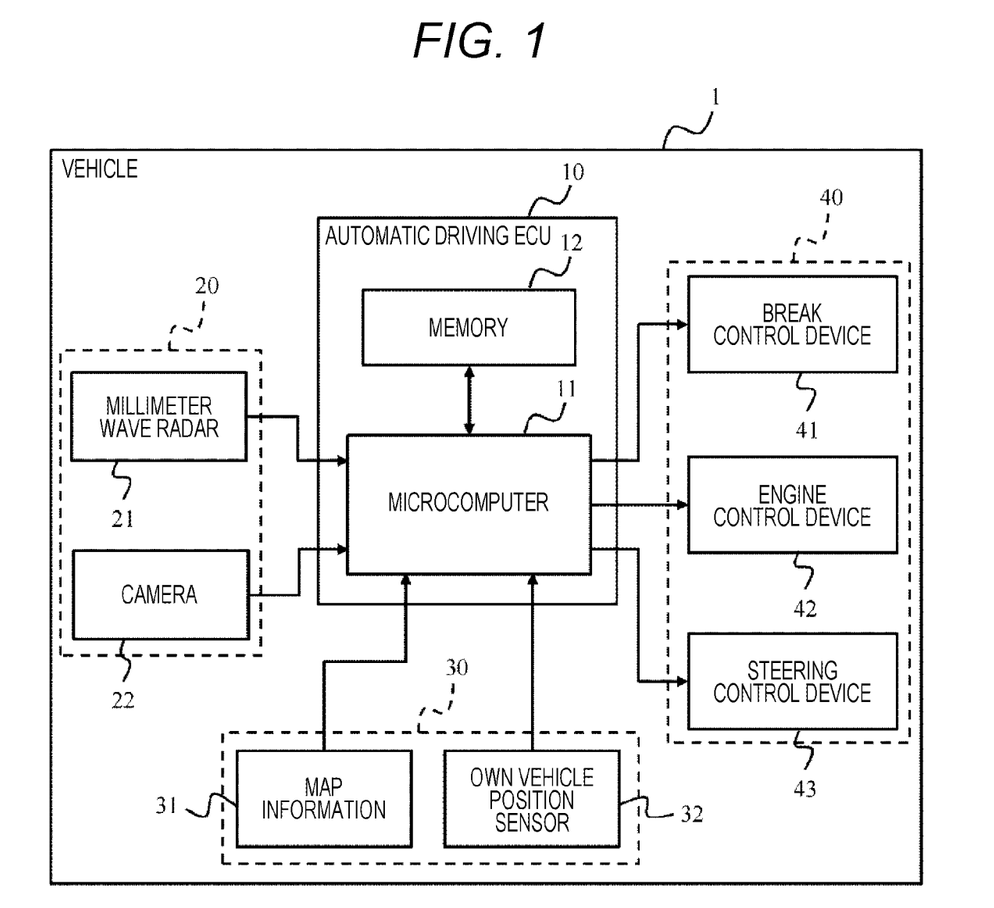
FIG. 1 is a system configuration diagram of an electronic control device of a vehicle.

An embodiment will be described with reference to FIGS. 1 to 7. FIG. 1 is a system configuration diagram of an electronic control device of a vehicle according to the present embodiment.

The vehicle 1 includes, for example, a vehicle body, wheels disposed on the front, rear, right, and left of the vehicle body, an engine mounted on the vehicle body, a driver cabin (which are not illustrated), and the like. The automatic driving ECU 10 is an electronic control device for automatically driving the vehicle 1. The automatic driving ECU 10 includes, for example, an arithmetic processing unit (microcomputer) 11 and a memory 12 used by the microcomputer 11.

The external information detection unit 20 that detects external information of the vehicle 1 is connected to the automatic driving ECU 10. The external information detection unit 20 includes, for example, a millimeter wave radar 21 and a camera 22. In addition to these sensors 21 and 22, an ultrasonic sensor, an infrared sensor or the like may be used. In the following description, the millimeter wave radar 21 and the camera 22 may be referred to as sensors 21 and 22.

Also connected to the automatic driving ECU 10 is a vehicle state detection unit 30 that detects an internal state of the vehicle 1. The vehicle state detection unit 30 includes, for example, map information 31 and an own vehicle position sensor 32. The own vehicle position sensor 32 may be a global positioning system (GPS) or a position detection system in which a vehicle speed sensor or an acceleration sensor is combined with the GPS.

The automatic driving ECU 10 performs arithmetic processing related to automatic driving using the microcomputer 11 on the basis of the external information supplied from the external information detection unit 20, the map information 31, and the information from the own vehicle position sensor 32. After calculating a traveling trajectory of the own vehicle as a result of the calculation, the automatic driving ECU 10 transmits a control command value to the lower level ECU group 40 including a brake control device 41, an engine control device 42, and a steering control device 43. As a result, the own vehicle 1 travels automatically on a safe route.

The data input from the external information detection unit 20 to the automatic driving ECU 10 may be raw data directly output from the sensors 21 and 22 or data preprocessed by a dedicated ECU (not illustrated) for the sensors 21 and 22.

Figure 2:
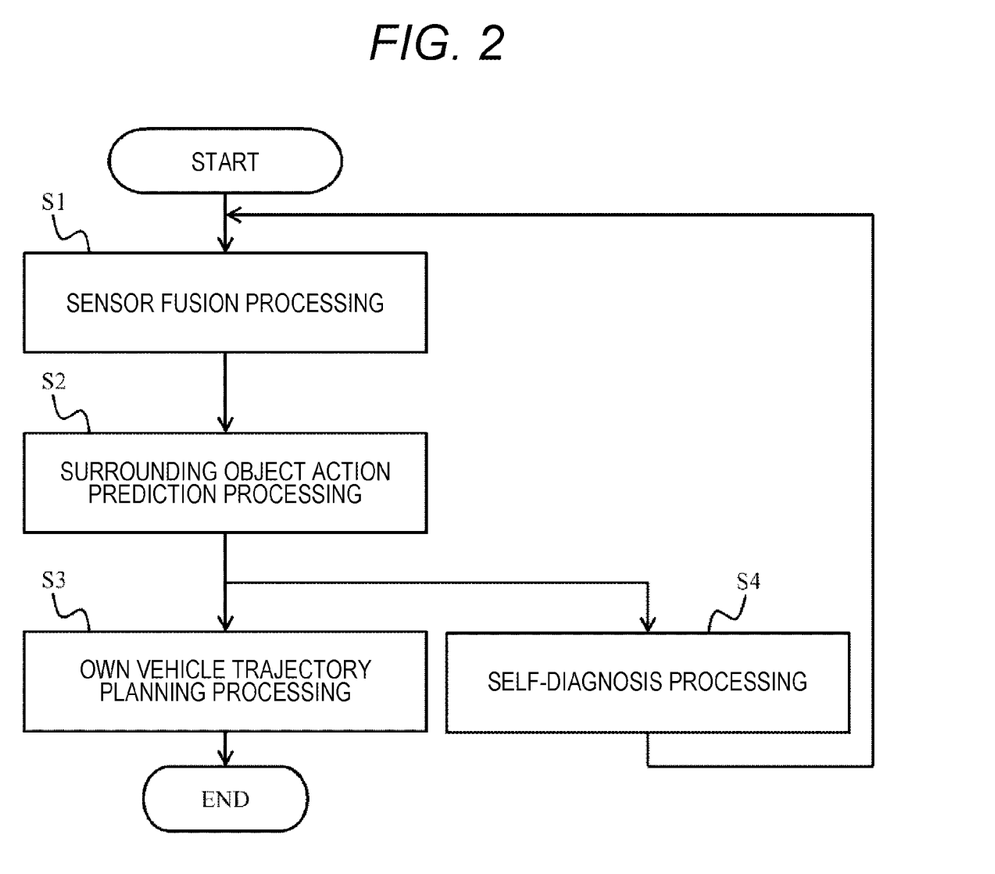
FIG. 2 is a flowchart illustrating the entire process.

The flowchart of FIG. 2 illustrates the main processing of the automatic driving ECU 10. This processing is executed by the microcomputer 11 on a predetermined cycle.

The microcomputer 11 executes calculations of sensor fusion processing S1 for integrating various pieces of external information provided from the external information detection unit 20, surrounding object action prediction processing S2 for predicting the action of objects around the own vehicle using the map of object around the own vehicle which is obtained as a result of the sensor fusion processing S1, own vehicle trajectory planning processing S3 for generating an own vehicle trajectory on the basis of the action prediction of the surrounding objects around the own vehicle, and self-diagnosis processing S4.

Figure 3:
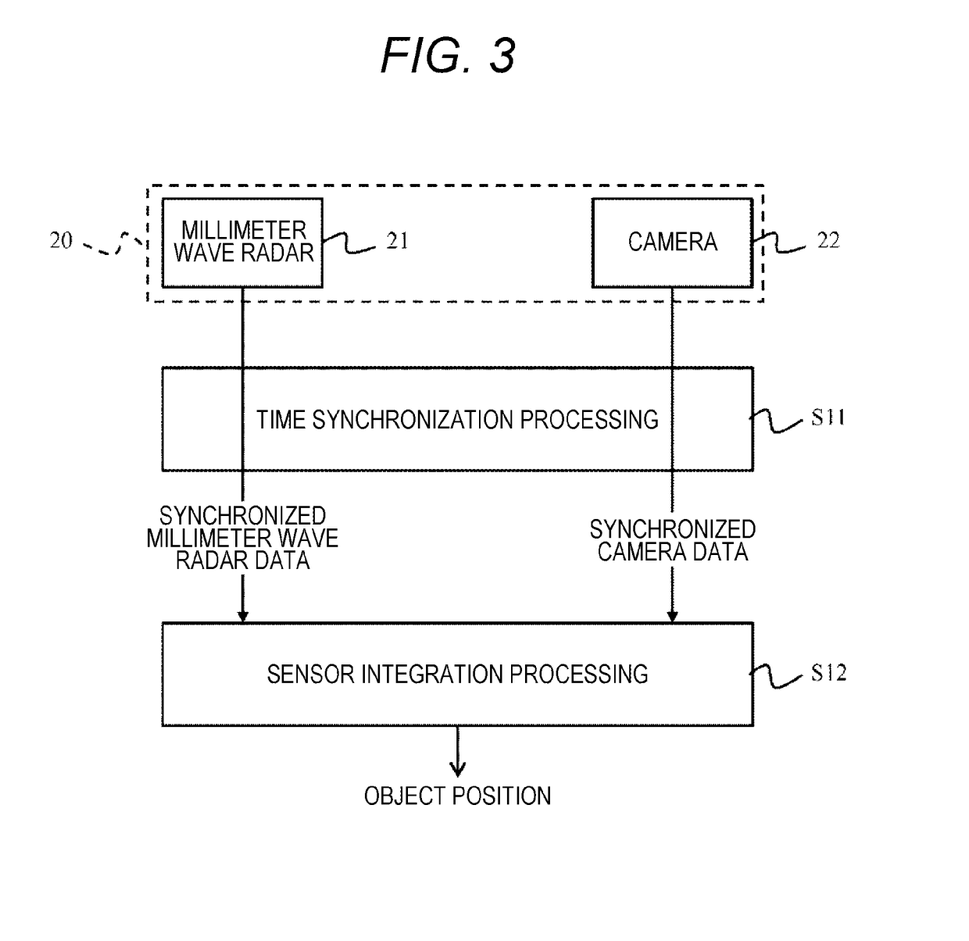
FIG. 3 is a block diagram illustrating an operation of sensor fusion processing.

FIG. 3 illustrates an outline of internal processing of the sensor fusion processing S1. The sensor fusion processing S1 is an example of the "integrated calculation unit" and performs time synchronization processing S11 and sensor integration processing S12.

In the sensor fusion processing S1, sensor data provided from the millimeter wave radar 21 or the camera 22 to the automatic driving ECU 10 are not temporally synchronized. Therefore, the sensor data on which a time stamp is provided is received from the external information detection unit 20 to perform the time synchronization processing S11.

The data on which the time synchronization processing S11 has been completed is referred to as synchronized millimeter wave radar data and synchronized camera data. The sensor integration processing S12 calculates position coordinates of the surrounding objects located around the vehicle 1 on the basis of the synchronized millimeter wave radar data and the synchronized camera data. The sensor integration processing S12 maps the position of the objects around the own vehicle 1 by referring to the map around the own vehicle from the map information 31 using the sensor value from the own vehicle position sensor 32, in addition to the position coordinates of each surrounding object.

Figure 4:
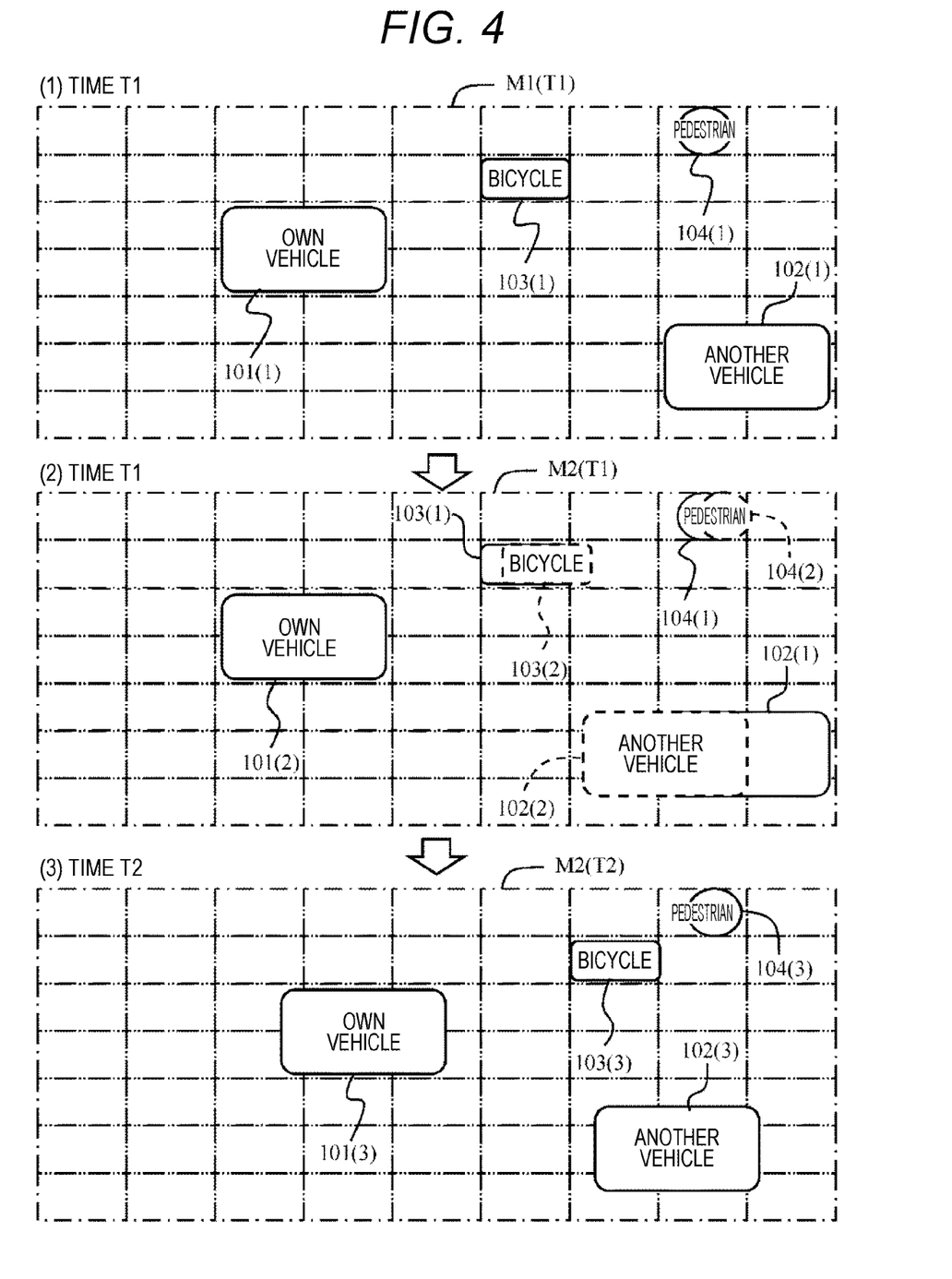
FIG. 4 is an explanatory view illustrating a difference over time between a map of object and a prediction map of object around an own vehicle indicating positions of objects around the own vehicle.

FIG. 4 illustrates an example plotting objects, using the sensor fusion processing S1, on a map of object around the own vehicle M by integrating information of positions, size, and moving speed of the objects around the own vehicle detected with the millimeter wave radar 21 and the stereo camera 22. In addition to an own vehicle position 101, the map of object around the own vehicle M also maps another vehicle position 102, a bicycle position 103, and a pedestrian position 104.

A map of object around the own vehicle M1 includes a map indicating the current state (a map indicating the current situation) and a map predicting a state at a future point of time. A reference symbol M1(T1) indicates the actual map created at time T1. A reference symbol M2(T1) indicates a map predicting a future situation at time T2 at time T1. A reference symbol M2(T2) indicates the actual map created at time T2. The predicted map may be referred to as a prediction map.

FIG. 4(1) illustrates the map of object around the own vehicle M1(T1) indicating the current state at time T1 created by the sensor fusion processing S1 at time T1. It is assumed that the own vehicle 101(1) travels toward the right in the drawing. Objects such as another vehicle 102(1), a bicycle 103(1), and a pedestrian 104(1) are present in the traveling direction of the own vehicle 101(1). As used herein, the numbers in parentheses following the symbols of the objects correspond to the numbers in parentheses of FIGS. 4(1) to (3). In the following description, when the creation time and prediction time are not distinguished, the symbols are abbreviated such as the own vehicle 101, the other vehicle 102, the bicycle 103, and the pedestrian 104.

FIG. 4(2) illustrates the map of object around the own vehicle M2(T1) predicting the situation at time T2 created at time T1 by the surrounding object action prediction processing S2. The surrounding object action prediction processing S2 predicts actions of the surrounding objects around the own vehicle 1 on the microcomputer 11 on the basis of the map of object around the own vehicle M1(T1).

In the surrounding object action prediction processing S2, the actions of various surrounding objects 102(1) to 104(1) mapped on the map of object around the own vehicle M1(T1) are predicted. A prediction method includes, for example, a method of extrapolating and finding the future position of the surrounding objects on the basis of the current position and speed of each surrounding object.

The surrounding object action prediction processing S2 provides a prediction map around the own vehicle M2(T1) predicting the future of the objects around the own vehicle, as illustrated in FIG. 4(2). The prediction map around the own vehicle M2(T1) maps a predicted position 101(2) of the own vehicle 1, a predicted position 102(2) of the other vehicle, a predicted position 103(2) of the bicycle, and a predicted position 104(2) of the pedestrian.

In FIG. 4(2), the predicted positions of the objects by the surrounding object action prediction processing S2 are indicated by dotted lines for the sake of explanation. The other vehicle position 102(1), the bicycle position 103(1), and the pedestrian position 104(1) at the current time T1, which result from the sensor fusion processing S1, are indicated by solid lines. The actual positions are not necessarily included in the result of the actual surrounding object action prediction processing S2. Although only one predicted position is illustrated for each object in FIG. 4(2), a number of predicted positions necessary for the later own vehicle trajectory planning processing S3 can be generated for each object.

Assume, for example, that the trajectory of the own vehicle 1 is planned for 10 seconds for every 100 milliseconds in the own vehicle trajectory planning processing S3, a maximum of 100 predicted positions are generated for each object (other vehicles, bicycles, pedestrians, etc.) (100=10,000 milliseconds/100 milliseconds). Using the predicted positions of the objects, the own vehicle trajectory planning processing S3 is performed on the microcomputer 11, and a vehicle trajectory is generated. A control command value to the lower ECU group 40 which satisfies the generated vehicle trajectory is generated and transmitted to the lower ECU group 40. Thus, the main function processing of the automatic driving ECU 10 is completed.

On the other hand, in the main function processing flow of the automatic driving ECU 10, the self-diagnosis processing S4 diagnoses an abnormality in the input values of the sensor fusion processing S1 and the sensors 21 and 22.

Figure 5:
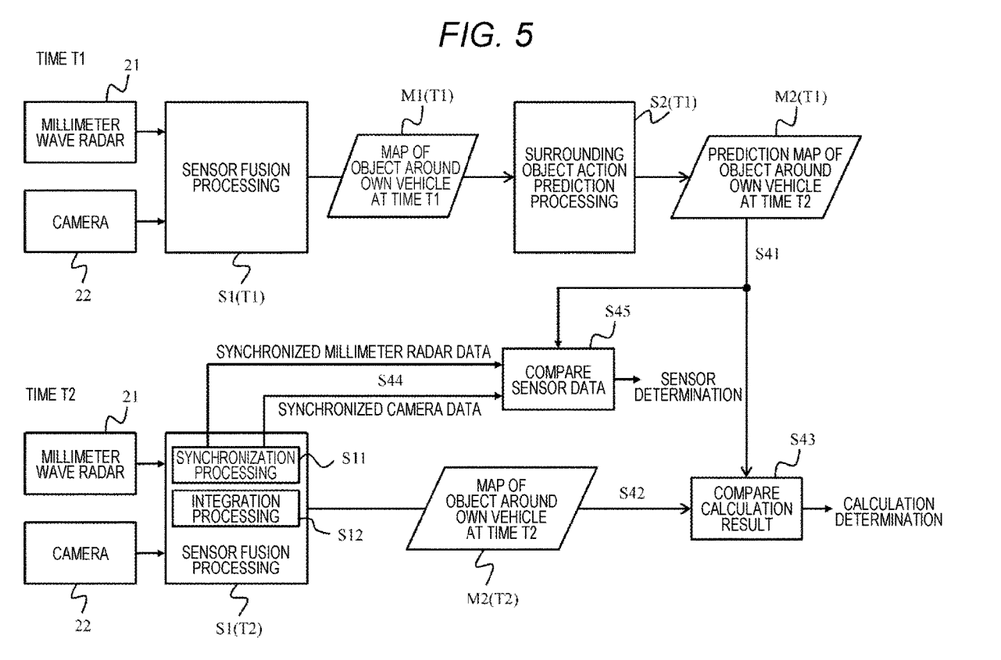
FIG. 5 is a block diagram of a self-diagnosis function that determines an abnormality of a sensor or a microcomputer.

FIG. 5 illustrates an overall configuration of the self-diagnosis processing S4. Note that the self-diagnosis processing (abnormality determination processing) illustrated in FIG. 5 is provided by extracting the relevant part from the main function processing flow of the automatic driving ECU 10 illustrated in FIG. 2.

Figure 6:
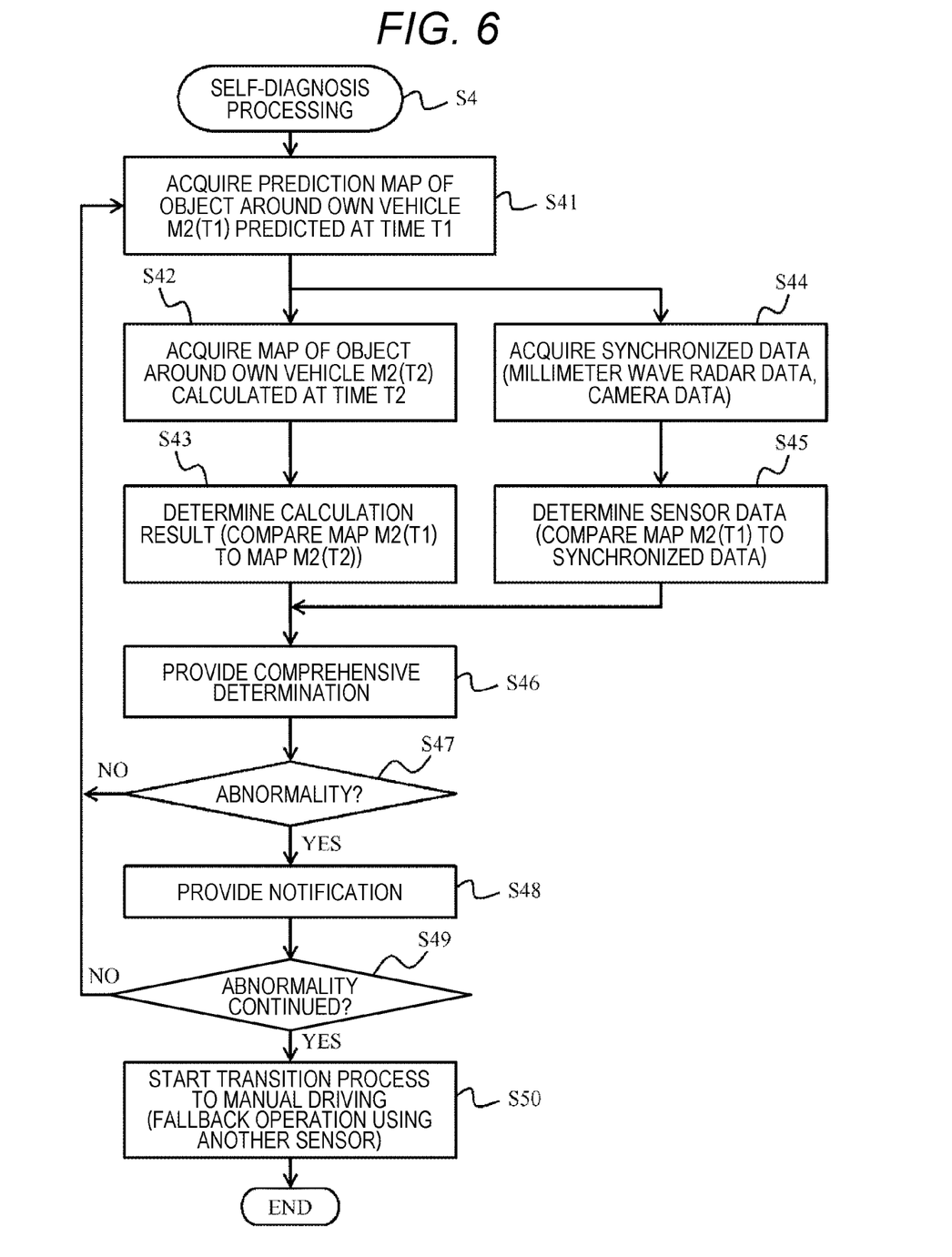
FIG. 6 is a flowchart of self-diagnosis processing.

The main function processing of the automatic driving ECU 10 is periodic, and after completion of a series of processing steps started at a certain time T1, similar processing steps start again at the next time T2. Therefore, in FIG. 5, the flow of processing steps in the automatic driving ECU 10 is illustrated by indicating a part of the series of processing steps in the horizontal direction and the time to start the series of process steps in the vertical direction. Details of the processing will be described later with reference to FIG. 6. In FIG. 5, step numbers indicating the correspondence with the process of FIG. 6 are described.

A series of processing steps S1(T1) and S2(T1) started at time T1 determines the map of object around the own vehicle M1(T1) at time T1, and determine the surrounding prediction map M2 (T1) at time T2 calculated at time T1 (FIG. 4(1), (2)). Further, a series of processing steps S1(T2) started at time T2 determines a surrounding object position M2(T2), which is a map indicating the positions of surrounding objects at time T2 (FIG. 4(3)).

In other words, it is possible to determine whether the sensor fusion processing S1 includes the abnormality by comparing the prediction map around the own vehicle M2(T1) predicted at time T1 to the surrounding object map M2(T2) detected at time T2 (S43). By comparing the prediction map around the own vehicle M2(T1) predicted at time T1 to the sensor data (sensor data after time synchronization processing) acquired from the sensors 21 and 22 at time T2 (S45), it is possible to determine whether the sensors 21 and 22 have an abnormality.

As described later with reference to FIGS. 6 and 7, the self-diagnosis processing S4 provides a final comprehensive determination on the basis of the diagnosis result (determination result) on the calculation result of the sensor fusion processing S1 and the diagnosis result (determination result) on the sensor data. Then, the automatic driving ECU executes control such as notifying the driver of abnormality detection or assigning the driver to drive the vehicle 1 according to the final comprehensive determination.

FIG. 6 is a flowchart illustrating a detailed example of the self-diagnosis processing S4 executed by the microcomputer 11. It is assumed that the current time is T2.

The microcomputer 11 acquires the surrounding object prediction map M2(T1) predicted at time T1 from the surrounding object action prediction processing S2 (S41). The microcomputer 11 acquires the map of object around the own vehicle M2(T2) calculated at time T2 (S42). Then, the microcomputer 11 compares the prediction map M2(T1) acquired in step S41 to the current map M2(T2) acquired in step S42 to determine whether the abnormality has occurred in the calculation result of the sensor fusion processing S1 (S43).

Here, an example of the comparison method in step S43 is described. For example, there is a method of comparing the deviation width of the position of each surrounding object with a predetermined threshold. There is a position error of less than one grid on the drawing between the predicted position 103(2) of the bicycle at time T2 calculated at time T1 in FIG. 4(2) and the position 103(3) of the bicycle at time T2 in FIG. 4(3).

Assuming, therefore, that the threshold for detecting the presence or absence of abnormality is defined, for example, to be "half grid", it can be determined that an abnormality has occurred in the bicycle position 103(3) at time T2. This makes it possible to detect the presence or absence of abnormality that has occurred before the sensor fusion processing S1 is done in the main function processing flow of the automatic driving ECU 10. The determination result of step S43 is sent to the comprehensive determination step S46.

On the other hand, the microcomputer 11 acquires synchronized millimeter wave radar data and synchronized camera data from the time synchronization processing S11 in the sensor fusion processing S1 (S44). The microcomputer 11 compares the synchronized data (synchronized millimeter wave radar data, synchronized camera data) acquired in step S44 to the surrounding object predicted position M2(T1) at time T2 calculated at time T1 (S45).

In the comparison processing in step S45, the surrounding object predicted position M2(T1) at time T2 calculated at time T1 is regarded as correct data, and the difference between the synchronized millimeter wave radar data and the actual position of each surrounding object indicated by the synchronized camera data is compared to a predetermined threshold. When the difference generated in the sensor data is equal to or greater than the threshold, the microcomputer comes to determine whether the sensor data is abnormal, that is, whether the sensors 21 and 22 are abnormal.

Similar to the above-described abnormality determination (S43) of the sensor fusion processing S1, the presence or absence of abnormality of the sensor data can be determined using the threshold as described above. The synchronized millimeter wave radar data and the synchronized camera data used for comparison may be obtained from the time synchronization processing S11 to obtain data synchronized with time T2. Alternatively, synchronized data at time closest to time T2 obtained in the process of time synchronization processing S11 may be used. The determination result of step S45 is sent to the comprehensive determination step S46.

The microcomputer 11 performs comprehensive determination on the basis of the determination result of step S43 (the determination result of the sensor fusion processing S1) and the determination result of step S45 (the determination result of the sensor data) (S46), whereby the microcomputer 11 can detect the abnormality generated in the sensor fusion processing S1, the abnormality generated in the millimeter wave radar 21, and the abnormality generated in the camera 22.

Figure 7:
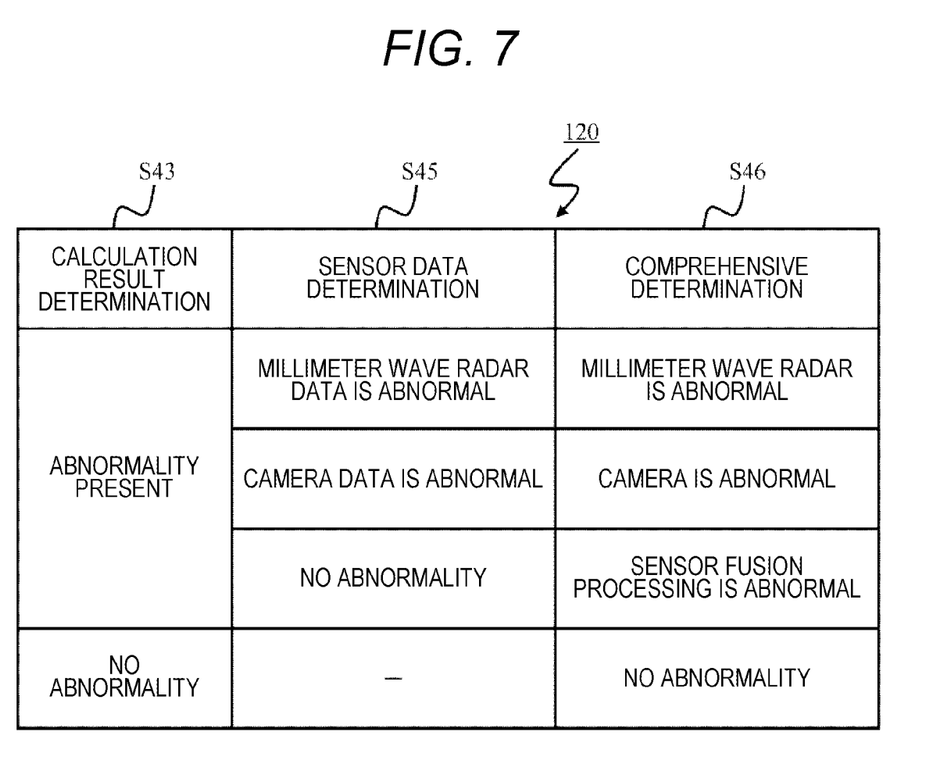
FIG. 7 is an explanatory drawing illustrating a method of carrying out comprehensive determination on the basis of the determination result of a microcomputer and the determination result from sensor data.

The comprehensive determination method according to patterns of the determination results in steps S43 and S45 is described by referring to a table 120 of FIG. 7. The comprehensive determination table 120 associates the determination result S43 of the sensor fusion processing S1 with the determination result S45 of the sensor data and the comprehensive determination result S46. In FIG. 7, the determination result S43 of the sensor fusion processing S1 is illustrated as "calculation result determination".

The microcomputer 11 determines whether the abnormality has occurred in the sensor fusion processing S1 from the determination result S43 of the sensor fusion processing S1. When the presence of the abnormality in the sensor fusion processing S1 is determined, the microcomputer 11 refers to the determination result S45 of the sensor data from the sensors 21 and 22. At this time, the microcomputer 11 can determine that the abnormality is in the sensor fusion processing S1 if the abnormality is not applicable to either the abnormality in the millimeter wave radar 21 or the abnormality in the camera 22.

The determination method of FIG. 7 is described. If the presence of the abnormality is determined in step S43 and the abnormality in the millimeter wave radar data 21 is determined in step S45, the comprehensive determination result is "abnormality in the millimeter wave radar". Similarly, if the presence of the abnormality is determined in step S43 and the abnormality in the camera 22 is determined in step S45, the comprehensive determination result is "abnormality in the camera". Similarly, if the presence of the abnormality is determined in step S43 and no abnormality is determined in step S45, the comprehensive determination result is "abnormality in the sensor fusion processing".

If no abnormality is determined in step 43, the comprehensive determination result is "no abnormality". Since the sensor fusion processing S1 uses the sensor data from the sensors 21 and 22, it can be considered that no abnormality occurs in the sensor data if no abnormality occurs in the sensor fusion processing S1.

Refer to FIG. 6 again. The microcomputer 11 determines whether the comprehensive determination result is "abnormal" (S47) and, if the abnormality is determined (S47: YES), notifies the driver in the vehicle 1 of the abnormality being detected (S48). For example, the microcomputer 11 provides voice output or displays a message such as "abnormality is detected in the automatic driving system".

Since a momentary abnormality may occur in the sensor value due to noise or the like, the notification may be executed in step S48 when the "abnormality" is determined in the comprehensive determination result in the step S47 for at least a predetermined number of times. The notification in step S48 is the notification as a precaution before the transition process from automatic driving to manual driving starts.

After notifying the driver in step S48, the microcomputer 11 determines whether the abnormal state continues (S49). For example, when the comprehensive determination result continues to be determined as "abnormal" for at least another predetermined number of times (S49: YES), the microcomputer 11 starts fallback operation processing (S50).

Although not illustrated, the fallback operation processing, for example, turns on a hazard lamp, changes the traveling control to enter a predetermined stop operation, ignores the input of the sensor determined as abnormal, and continues the automatic driving using remaining other normal sensors alone, and switches to the manual driving after a predetermined time after the notification to the driver. This ensures the safety of the occupant when the abnormality occurs in the automatic driving system. The notification processing (S46, S48) does not only notifies the driver in the vehicle 1 but also notifies, for example, surrounding other vehicles, or notifies a server (not illustrated) that monitors the traveling of the vehicle. Log information indicating changes of parameters during the automatic driving may be stored in the memory 12, and be saved by associating the time of detecting the abnormality and the kinds of the abnormality with the log information. This can also be useful for investigating the cause of the abnormality.

According to the present embodiment configured as described above, the actions of the objects around the own vehicle are predicted on the basis of sensor data from the external information detection unit 20, and the prediction result is determined to be correct or incorrect on the basis of the current sensor data acquired from the external information detection unit 20. Therefore, according to the present embodiment, the self-diagnosis can be performed with a simple configuration without multiplexing the external information detection unit 20, the microcomputer 11, and the like, and the reliability can be improved without increasing the manufacturing cost.

In other words, according to the present embodiment, the abnormality occurring in the external information detection unit 20 and the sensor fusion processing S1 can be detected without multiplexing the sensor fusion processing S1 in the automatic driving ECU 10 or the external information detection unit 20 (millimeter wave radar 21 and camera 22) used in the automatic driving ECU 10. The determination method of the presence or absence of abnormality according to the present embodiment is on the basis of comparison operation using a map or information obtained in the process of the main function processing of the automatic driving ECU 10. For this reason, even when the method (self-diagnosis processing) for determining the presence or absence of an abnormality according to the present embodiment is additionally mounted on the automatic driving ECU 10, an increase in the processing load of the automatic driving ECU 10 can be suppressed.

It should be noted that the present invention is not limited to the above-described embodiment. Those skilled in the art can make various additions and modifications within the scope of the present invention. In the above-described embodiment, the present invention is not limited to the configuration example illustrated in the accompanying drawings. It is possible to appropriately change the constitution and processing method of the embodiment within the scope of achieving the object of the present invention.

In addition, each constituent element of the present invention can arbitrarily be selected and sorted, and the invention having a configuration which is selected and sorted is also included in the present invention. Furthermore, the configurations described in the appended claims can be combined with any combination besides those specified in the claims.

In the embodiment described above, the method of determining the presence or absence of abnormality by comparing two pieces of map information at time T1 and time T2 has been described. Alternatively, as a method of abnormality determination, for example, the presence or absence of abnormality may be determined by comparing position information and predicted position information among three or more times such as time T1, T2, and T3.

The abnormality detection method (self-diagnosis method) described in the above embodiment verifies the validity of the automatic driving ECU processing at the next time T2, on the assumption that the automatic driving ECU processing at a certain time T1 is normal. Therefore, it is preferable to confirm that the automatic driving ECU processing is normal, for example, at key-on time when the engine key is turned on or at the start of the automatic driving ECU processing.

As the confirmation method, for example, there is a method of performing the same processing at each of the automatic driving start time and the next time, and confirming whether or not the result of the processing matches. Further, while the automatic driving ECU 10 is operating, position detection is performed on an object such as a landmark whose position is known, such as a building, etc., and the movement amount of the vehicle 1 is estimated using the map information 31 and the own vehicle position sensor 32. The validity of the external information detection unit 20 and the sensor fusion processing S1 can also be confirmed by comparing the value with the position of an object such as a landmark.

REFERENCE SIGNS LIST 1 vehicle
10 automatic driving ECU
11 microcomputer
20 external information detection unit
21 millimeter wave radar
22 camera
30 vehicle state detection unit
31 map information
32 own vehicle position sensor
40 lower level ECU group

The invention claimed is:

1. An electronic control device of a vehicle, comprising:
an action prediction unit that predicts an action of an object around the vehicle in accordance with external information acquired from an external information detection unit that detects external information of the vehicle; and
a determination unit for a detection unit that determines whether an abnormality has occurred in the external information detection unit by comparing the external information acquired from the external information detection unit at the time corresponding to a prediction result of the action prediction unit to the prediction result of the action prediction unit.

2. The electronic control device of the vehicle according to claim 1, further comprising:
an integrated calculation unit that integrally calculates the external information; and
a determination unit for a calculation unit that determines whether an abnormality has occurred in the integrated calculation unit by comparing a calculation result of the integrated calculation unit at the time corresponding to the prediction result of the action prediction unit to the prediction result of the action prediction unit.

3. The electronic control device of the vehicle according to claim 2, further comprising a comprehensive determination unit that executes comprehensive determination in accordance with a determination result of the determination unit for the detection unit and a determination result of the determination unit for the calculation unit.

4. The electronic control device of the vehicle according to claim 3, further comprising a notification unit that outputs, when the comprehensive determination unit determines the presence of abnormality, an abnormality notification indicating detection of an abnormal state to a driver of the vehicle.

5. The electronic control device of the vehicle according to claim 4, wherein the notification unit outputs the abnormality notification when the comprehensive determination unit determines the presence of abnormality for at least a predetermined number of times set in advance.

6. The electronic control device of the vehicle according to claim 5, wherein processing to shift the operation of the vehicle to the driver is started when the comprehensive determination unit determines the presence of abnormality for at least another predetermined number of times set in advance after the notification unit outputs the abnormality notification.

7. The electronic control device of the vehicle according to claim 1, wherein the external information detection unit includes at least one of a radar and a camera.

* * * * *